United States Patent [19]
Lavalerie et al.

[11] Patent Number: 4,782,863
[45] Date of Patent: Nov. 8, 1988

[54] REMOVABLE SHUTTER FOR AN ORIFICE ACCESSIBLE ONLY THROUGH A NARROW PASSAGE

[75] Inventors: Claude Lavalerie, L'Isle Adam; Jean-Pierre Cartry, Lyons, both of France

[73] Assignee: Framatome, Courbevoie, France

[21] Appl. No.: 89,023

[22] Filed: Aug. 24, 1987

[30] Foreign Application Priority Data

Jul. 16, 1985 [FR] France ............................. 85 10899

[51] Int. Cl.⁴ ............................................. F16L 55/12
[52] U.S. Cl. ...................................... 138/89; 376/204
[58] Field of Search ............................ 138/89, 93, 90; 220/232; 376/203, 204

[56] References Cited

U.S. PATENT DOCUMENTS 4,482,076 11/1984 Wentzell ........................ 138/93 X
4,483,457 11/1984 Schukei et al. .................. 138/93 X
4,637,588 1/1987 Wihelm et al. .................. 138/93 X

*Primary Examiner*—James E. Bryant, III
*Attorney, Agent, or Firm*—Pollock, Vande Sande & Priddy

[57] ABSTRACT

The shutter is composed of an assembly three independent panels comprising: a central panel (2) having a flange (6) for fastening to the orifice to be closed and having a seal and two rectilinear lateral rims (16, 18), and two side panels (1, 3), each comprising, on one part of its periphery, a flange (5, 7) for fastening on the periphery of the orifice to be closed, and which is provided with a seal, and, on the other part of its periphery, a rectilinear rim (12, 14) which forms a face for support on one of the lateral rims (16, 18) of the central panel (2) and on which are mounted members (20) for positioning the side panels (1, 3) on one of the lateral rims (16, 18) of the central panel.

7 Claims, 4 Drawing Sheets

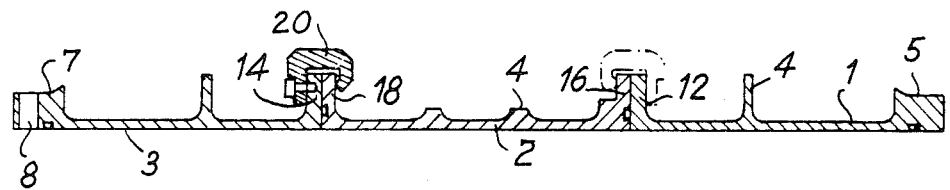
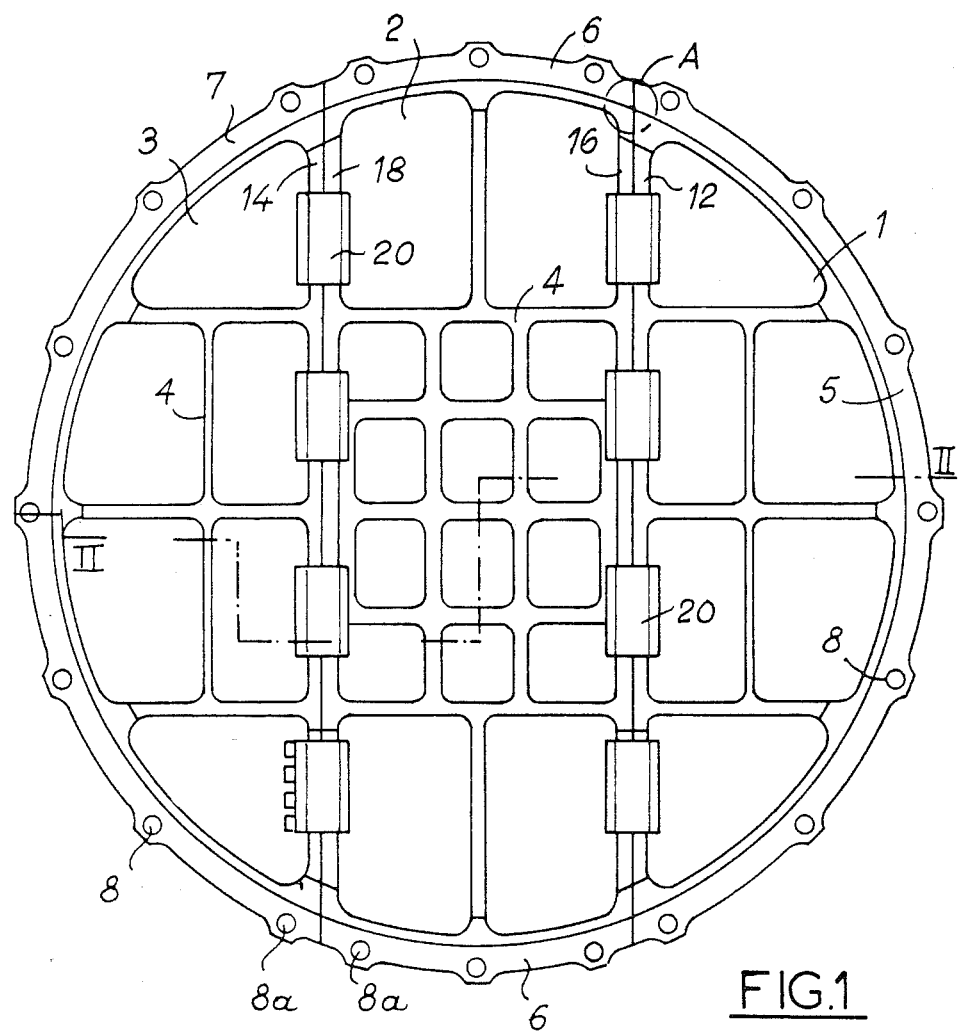

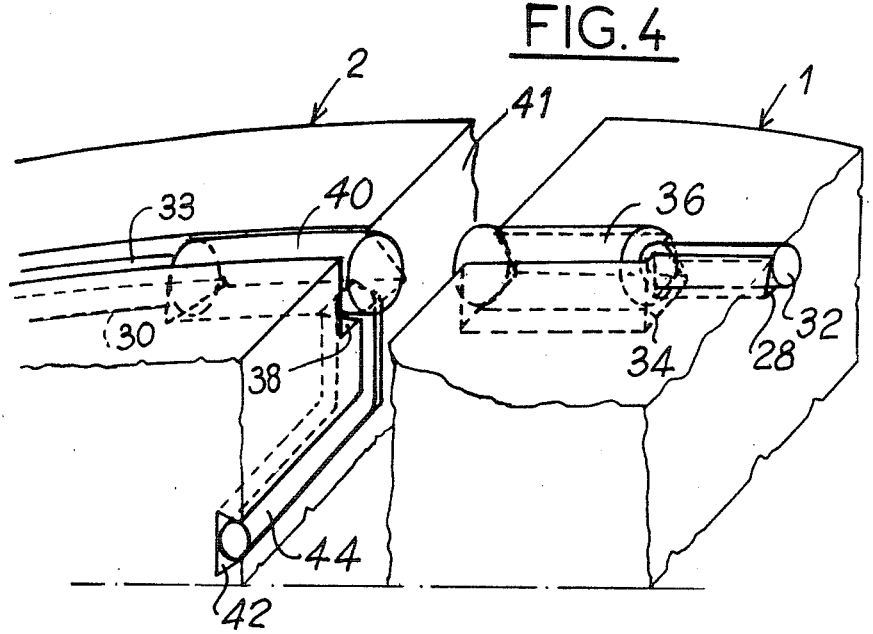
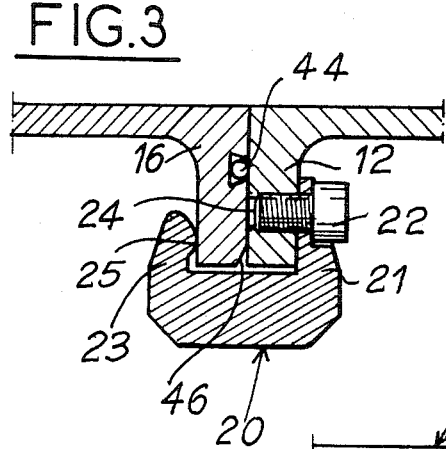
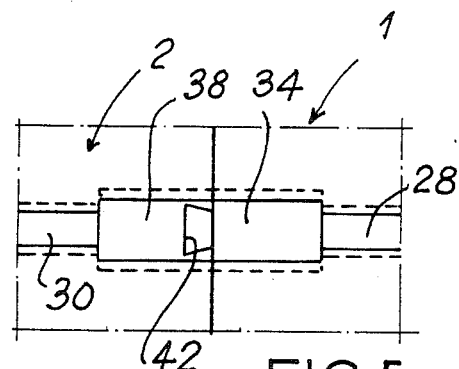
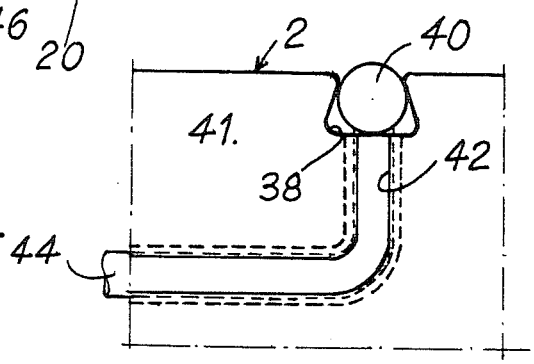

REMOVABLE SHUTTER FOR AN ORIFICE ACCESSIBLE ONLY THROUGH A NARROW PASSAGE

FIELD OF THE INVENTION

The present invention relates to a removable shutter intended for the closure of an orifice difficult of access, and particularly for the temporary closure of the orifice connecting a duct of the primary circuit of a pressurized water nuclear reactor to the water container of a steam generator.

BACKGROUND OF THE INVENTION

The pressurized water heated in contact with the fuel elements of a nuclear reactor passes in fact through a generator of this kind, circulating in a bundle of U-tubes and transmitting its heat to a secondary fluid, which is thus vaporized inside the generator. The bundle of U-tubes is supported by a tube plate which, with the bottom of the steam generator, delimits a water container separated into two compartments for the inflow and outflow, respectively, of the pressurized water each of these compartments incorporating an orifice which connects it to the primary circuit of the reactor and whose diameter must be large to allow high flow rates.

The considerable risk of corrosion of the tubes in the bundle and the danger entailed by communication between the primary and secondary circuits via holes formed in these tubes through the action of this corrosion make it necessary to subject this bundle of tubes to frequent maintenance and checking operations. It must therefore be possible both to gain access to each of the compartments of the water container, and to isolate these compartments from the primary circuit of the reactor.

Access to the compartments is gained via manholes which must have the smallest possible dimensions, and consequently usually a diameter just sufficient for the normal passage of the operator. During normal operation of the reactor these access points must in fact be leaktightly closed, while the primary fluid contained in the water container is under very high pressure.

The isolation of the water container implies leaktight closure of the orifice making the connection to the primary circuit of the reactor, even though the circulation of this fluid has stopped. However, this orifice has a diameter substantially larger than that of the manhole giving access to the water container and constituting the only passage allowing the introduction of closure means, while in addition it must be closed quickly in order to ensure the safety of the operator.

Various types of shutter have therefore been proposed, consisting of a plurality of members articulated to one another and adapted to be folded, but these devices present difficulty in reconciling the requirements of leaktightness at high pressures, speed of installation, low weight, and ease of introduction through an orifice of small dimensions.

SUMMARY OF THE INVENTION

The present invention seeks to obviate these disadvantages by providing a removable shutter which will meet the above requirements.

To this end the invention relates to a removable shutter composed of an assembly of at least three independent panels comprising:

(1) a central panel having, on one part of its periphery, a flange which is intended for fastening on the periphery of the orifice to be closed and which is provided with a seal, of circular cross-section, on the other part of its periphery, two rectilinear lateral rims;

(2) a first side panel comprising, on one part of its periphery, a flange which is intended for fastening on the periphery of said orifice to be closed and which is provided with a seal of circular cross-section, on the other part of its periphery, a rectilinear rim which forms a face for support on one of the lateral rims of said central panel and on which are mounted members for the positioning of said first side panel on one of said lateral rims of said central panel; and (3) a second side panel comprising, on one part of its periphery, a flange which is intended for fastening on the periphery of said orifice to be closed and which is provided with a seal of circular cross-section, and on the other part of its periphery, a rectilinear rim which forms a face for support on one of said lateral rims of said central panel and on which are mounted members for the positioning of said second side panel on one of said lateral rims of said central panel.

According to another characteristic of the invention, each positioning member consists of a rider in which is engaged the rectilinear lateral rim of the adjacent central panel.

The shutter formed in this manner is easy to introduce through a hole of small diameter because each of the panels is independent. The assembly of these panels and the installation of the assembly on the orifice to be closed are effected by simple fitting operations, and in addition provide immediate peripheral leaktightness, since each panel carries its own seal.

BRIEF DESCRIPTION OF THE DRAWINGS

The following description of one embodiment, given by way of example and illustrated in the accompanying drawings, will clarify the invention. This embodiment relates to the temporary closure, inside the water container of a steam generator, of the orifice making the connection to the primary circuit of a nuclear reactor, but it is quite obvious that the invention can also be used in other fields.

FIG. 1 is a plan view of a shutter according to the invention, showing that face of the shutter which is intended to be turned in the direction opposite to that of the orifice;

FIG. 2 is a view in section on the line II—II in FIG. 1;

FIG. 3 is a detail view on a larger scale, showing in cross-section the interengagement of a side panel and a central panel;

FIG. 4 is a large-scale perspective view of the detail A in FIG. 1 before the side panel and the central panel have been brought together;

FIG. 5 is a plain view of the two components of FIG. 4 after the two panels have been assembled, but with the seal omitted;

FIG. 6 is a side view of the central panel of FIG. 4;

DESCRIPTION OF PREFERRED EMBODIMENT

Figure 7:
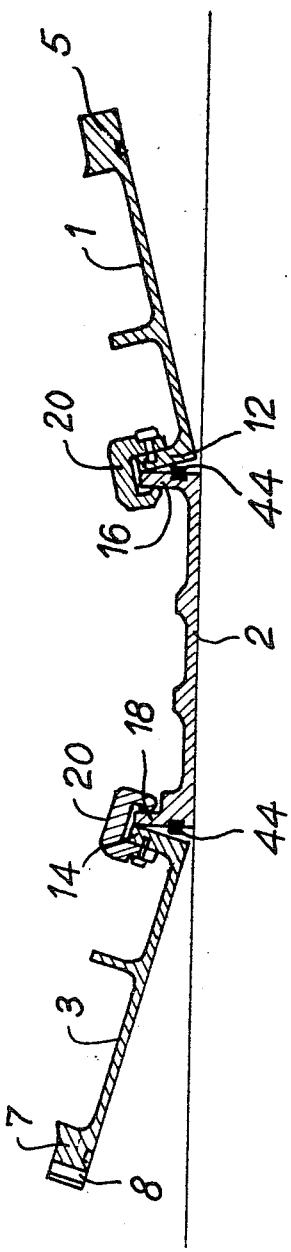
FIG. 7 is a schematic view showing the interengagement of the panels.

The shutter shown in FIGS. 1 and 2 consists of three panels 1, 2 and 3, respectively, which are fitted together to form a disc having the same diameter as the orifice which is to be closed. Each of these panels is made of a low density material, such as a light aluminum alloy, and incorporates a face provided with ribs 4 which enables it to be very strong and light in weight. This ribbed face is intended to be placed inside the water container, while the opposite face, which is flat, is turned towards the orifice to be closed. Each of the panels 1, 2 and 3 incorporates, on the part of its periphery which is incurved, an outside flange 5, 6, 7, respectively, which is provided with through holes 8 for fastening on the orifice to be closed. On each of these flanges the holes 8 are regularly spaced, but the distance separating the neighboring holes 8a of two adjacent panels is less than this normal spacing.

The peripheries of the panels are also provided with a rectilinear rim, projecting in the same direction as the ribs 4, for contact with the adjacent panel. Thus, each of the side panels 1 and 3 has a rectilinear rim 12, 14, while the central panel 2 has two parallel rectilinear rims 16 and 18, which bear respectively against the rims 12 and 14 when the shutter is mounted on the orifice to be closed, as shown in FIGS. 1 and 2.

At the time of assembly, as will be seen later on, positioning members in the form of riders 20 enable the lateral rims 16 and 18 of the central panel to be engaged in said riders. For this purpose at least one rider 20 is mounted on each of the rims 12 ad 14 of the side panels 1 and 3 and fastened to the latter by means of screws 22 which pass through the holes in a wing 21 of said rider and are screwed into holes 24 in the corresponding rim (FIG. 3). The wing 21 preferably becomes thinner in the direction of its free end and is provided with cavities receiving the heads of the screws 22. The second wing 23 of the rider 20 is slightly turned over inwards and forms a support and bracing bead 25 for the rims 16 or 18 of the central panel 2.

A plurality of riders are preferably mounted at regular intervals along the rims 12 and 14, their number varying according to the size of the shutter and the pressure which it must withstand.

Each of the panels 1, 2 and 3 is moreover provided in its flat face with a peripheral groove 28, 30 (FIGS. 4 and 5), for example of dovetail section, which receives a seal 32, 33 of circular cross-section the different panels have identical radii of curvature, so that when the shutter is assembled they form extensions of one another and constitute a continuous sealing device with the perimeter of the orifice.

To facilitate this continuity, the groove 28 of the side panel 1, as well as that of the side panel 3, has at each end a larger-sized portion 34 (FIGS. 4 and 5), and the seal 32 also has an end 36 of larger diameter. In addition, the length of the seal 32, 36 is slightly greater than that of the grooves 28, 34. Each of the peripheral grooves 30 of the central panel 2 likewise finishes at its two ends with a larger-sized portion 38 and, like the grooves 28, contains a seal 33 whose ends form cylinders 40 of larger diameter and whose length is greater than that of the groove which contains it. The application of the adjacent lateral rims 12, 16 and 14, 18 thus causes the seals 36, 40 to be compressed one against the other and thus provides effective leaktightness between the two adjacent panels.

Figure 8:
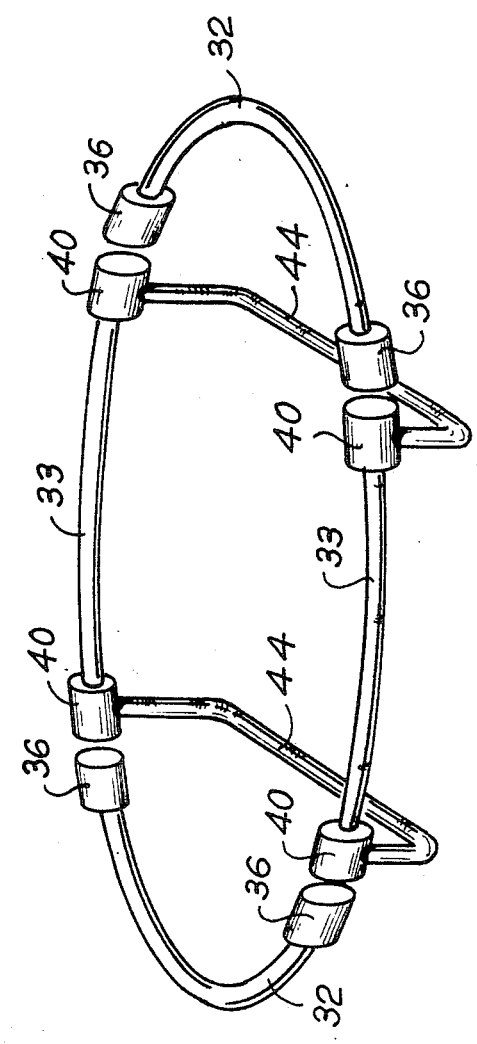
FIG. 8 is a schematic view in perspective of the seals of the shutter.

The central panel 2 is in addition provided in the outer or support face 41 of each of its lateral rims 16 and 18 with a longitudinal groove 42, which preferably likewise has a dovetail section and is intended to receive a seal 44. The groove 42 is curved upwards at each of its ends to meet the peripheral groove 38, as is shown more particularly in FIGS. 4 to 6. The seal 44 and the peripheral seal 40 of the central panel 2 are preferably integrally molded to form a continuous unit, as can be seen in FIG. 8. This figure shows in perspective the seals of the central panel and of the two side panels.

Each of the shutter panels is thus equipped in advance with its sealing means, while the side panels 1 and 3 carry the positioning members in the form of riders 20. These components can be transported and handled independently of one another, and can thus be introduced one after the other through the access hole into the water container of the steam generator. Their dimensions are easily adapted to the width of that hole, because the number of panels used can be varied, it being possible for a plurality of central panels 2 to be coupled side by side between the side panels 1 and 3 with the aid of additional riders 20.

Inside the water container of the steam generator the operator first installs the central panel 2, equipped with its seals, on the orifice to be closed (FIG. 7) with the aid of bolts (not shown). These bolts are not tightened, so as to allow lateral adjustment of the central panel during the installation of the side panels 1 and 3.

The operator then installs the first side panel 1, equipped with its seals and its riders 20, by inclining said side panel 1 in relation to the central panel 2 and engaging the lateral rim 16 of the central panel 2 in the riders 20.

The operator repeats this operation for the second side panel 3, inclining the latter relative to the central panel 1 and engaging the lateral rim 18 of the central panel 2 in the riders 20.

In order to facilitate this introduction, the lateral rims 16 and 18 of the central panel 2 are provided with an external chamfer 46 (FIG. 3).

In addition, the bead 25 formed on the inside of the wing 23 of the riders 20 constitutes an articulation point which facilitates the tilting of the side panels 1 and 3 relative to the central panel 2 during installation of the side panels on the orifice which is to be closed.

The thickness and stiffness of the lateral seal 44 resists the making of contact between the corresponding rims 12, 16 and 14, 18 respectively.

Finally, the operator lays the side panels 1 and 3 against the ring surrounding the orifice to be closed. The peripheral seal 30, 40, 32, 36 is applied against said ring, and each of the holes 8 in the outer flange of the shutter comes into alignment with a tapped hole in said ring.

It then suffices to fasten the shutter by means of bolts, the tightening of which will at one and the same time crush the peripheral seal and compress the lateral seals of the central panel between the two adjacent rims as the angle of inclination between the adjoining panels is progressively reduced.

At each of the junctions between panels, the increased diameter of the end of the seal assists contact between the two adjacent components, while the additional length of this seal in relation to that of the groove increases the compressive force. The continuity of the resulting sealing is thus ensured and the risk of leaks at these points is eliminated.

Centering pins or the like could obviously be provided on the panels in order to facilitate their interengagement and positioning relative to one another. Similarly, the shape of the side and central panels can easily be adapted to correspond to that of an orifice to be closed which has a shape other than circular.

The riders are made of a material having great mechanical strength.

The shutter can thus withstand high pressures, such as for example those which occur during operations for decontamination of the primary circuit of a pressurized water reactor.

The material of which the panels are made, particularly a light aluminum alloy, can easily be subjected to surface treatment enabling it to resist the chemical action of the products with which it must come into contact, particularly the reagents used in operations for the decontamination of the primary circuit of a nuclear reactor or of products used in petrochemistry.

Although the shutter described above comprises three panels, it is clear that the number of panels may vary, particularly in dependence on the dimensions of the orifice to be closed and of the access aperture. The shutter may comprise only two panels, or on the contrary comprise more than three, according to need. Furthermore, the shutter may contain one or more panels provided with only one connecting seal on their connection rim or on one of their rims.

We claim:

1. A removable shutter for an orifice which is accessible only through a narrow passage and which is formed by an assembly of at least three independent panels (1, 2, 3), said shutter comprising:
    (a) a central panel (2) having, on one part of its periphery, a flange (6) which is intended for fastening on the periphery of the orifice to be closed and which is provided with a seal (33, 40), and, on the other part of its periphery, two rectilinear lateral rims (16, 18);
    (b) a first side panel (1) comprising, on one part of its periphery, a flange (5) which is intended for fastening on the periphery of the orifice to be closed and which is provided with a seal (32, 36), and, on the other part of its periphery, a rectilinear rim (12) which forms a face for support on one of the lateral rims (16, 18) of said central panel (2) and on which are mounted members (20) for positioning said first side panel (1) on one of said lateral rims (16, 18) of said central panel;
    (c) a second side panel (3) comprising, on one part of its periphery, a flange (7) which is intended for fastening on the periphery of said orifice to be closed and which is provided with a seal (32, 36), and, on the other part of its periphery, a rectilinear rim (14) which forms a face for support on one of said lateral rims (16, 18) of said central panel (2) and on which are mounted members (20) for the positioning of said second side panel (3) on one of said lateral rims of said central panel, said positioning member consisting of a rider (20) in which is engaged the rectilinear lateral rim (16, 18) of said adjacent central panel (2).

2. A shutter according to claim 1, wherein one of said panels (1, 2, 3) is provided with a seal (44) on its rectilinear rim (12, 14, 16, 18) forming a face bearing against an adjacent panel.

3. A shutter according to claim 1, wherein said central panel (2) has a seal (44) on each of its two rectilinear lateral rims (16, 18) which form the faces bearing against said first and second side panels (1, 3).

4. A shutter according to claim 1, wherein each of said peripheral seals (32, 36–33, 40) of said central panel (2) and of said first and second side panels (1, 3) has two ends and terminates at each of said ends in a portion of greater diameter (36, 40).

5. A shutter according to claim 1, wherein the seals (32, 36–33, 40–44) are disposed in dovetail section grooves (28, 34–30, 40–42).

6. A shutter according to claim 3, wherein the seals (44) of the central panel (2) are molded in one piece.

7. A shutter according to claim 1, wherein each of the peripheral seals (32, 36–33-40) of said central panel and of said first and second side panels (1, 3) is placed in a groove and has a length greater than that of the groove in which it is placed.

* * * * *

UNITED STATES PATENT AND TRADEMARK OFFICE
CERTIFICATE OF CORRECTION

PATENT NO. : 4,782,863

DATED : NOVEMBER 8, 1988

INVENTOR(S) : LAVALARIE ET AL.

It is certified that error appears in the above-identified patent and that said Letters Patent is hereby corrected as shown below:

Title page, after item [22] and Column 1, after the title insert the following:

This is a continuation-in-part of U. S. Patent Application No. 885,640, filed July 15, 1986 (Abandoned).

Signed and Sealed this

Third Day of April, 1990

Attest:

HARRY F. MANBECK, JR.

*Attesting Officer*

*Commissioner of Patents and Trademarks*